INVENTORS
WILLIAM L. TENNEY
CHARLES B. MARKS

Patented June 3, 1952

2,599,209

UNITED STATES PATENT OFFICE 2,599,209

ROTARY PULSE JET ENGINE WITH RESONANT COMBUSTION CHAMBER AND TANGENTIALLY DISPOSED EXHAUST TUBES

William L. Tenney, Crystal Bay, Minn., and Charles B. Marks, Las Vegas, Nev.; said Marks assignor to said Tenney Application April 11, 1946, Serial No. 661,366

9 Claims. (Cl. 60—39.34)

This invention relates to heat engines and more particularly to the rotating type utilizing self-contained heat jet devices.

It is an object of the invention to provide a high output, low cost, high-speed heat engine capable of producing rotary motion and more particularly to provide a rotary heat engine of extremely simple, light weight but rugged construction, capable of producing high-speed rotary motion with a minimum of moving parts.

Other and further objects of the invention are those inherent in the apparatus herein illustrated, described and claimed.

The invention is illustrated with reference to the drawings in which

Throughout the drawings corresponding numerals refer to the same parts.

Figure 1:
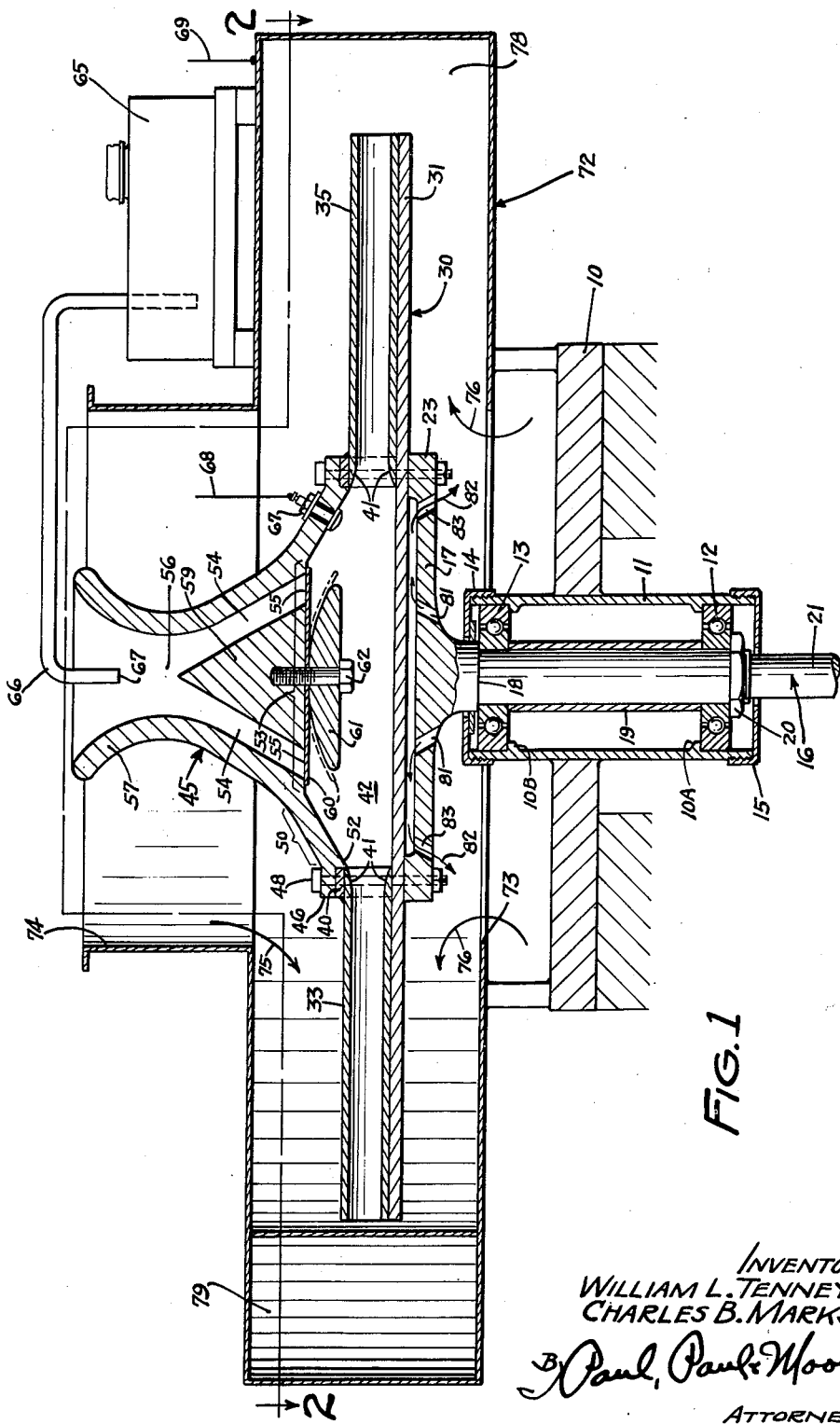
Figure 1 is a transverse sectional view, partly in elevation, of the apparatus of the invention, the sectioning being in the direction of arrows 1—1 of Figure 2.
Figure 2:
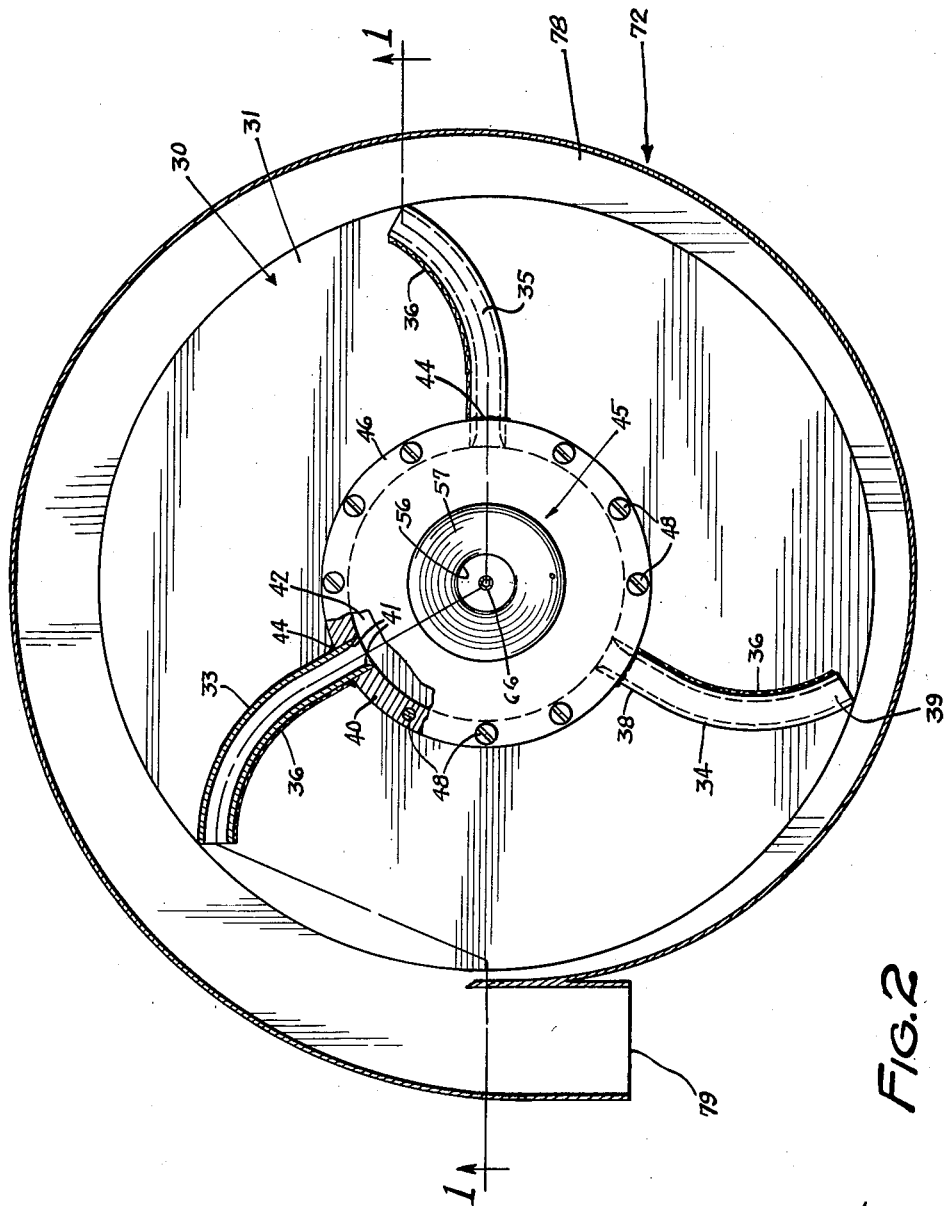
Figure 2 is a plan view, partly in section, taken along the line 2—2 of Figure 1.

Referring to the drawings, 10 indicates the mounting plate which is provided with a journal box 11 having therein a pair of precision ball bearings 12 and 13, which are located in the journal by means of internal shoulders 10A and 10B. The bearings are protected by a pair of screw caps 14 and 15 which may, if desired, be provided with suitable dust and grease retainers. In the bearings 12 and 13 there is journaled a shaft 16 which has a flange 17 at its upper end. The shaft is reduced in diameter at 18 so as to provide a stop against which the inner race of bearing 13 is abutted, the inner races of bearings 12 and 13 being maintained in suitable spaced relationship by tubular spacer 19. The lower bearing 12 is held in place by a retaining nut 20 which may be provided with any suitable locking device. The power take-off end 21 of the shaft 16 is, of course, of reduced diameter so as to allow removal of the nut 20.

The upper mounting flange 17 is provided with a thickened rim at 23 upon which the turbo-runner generally designated 30 is mounted. The turbo-runner is a circular plate 31, preferably of high quality steel to which one or more jet pipes, here illustrated as three pipes 33, 34 and 35, are suitably attached as by welding, as is indicated at 36. The jet pipes curve from a direction nearly radially outward at, for example, 38 and thence with a decreasing radius of curvature toward the end of the pipe at 39. The inner ends of the jet pipes are fastened into apertures in an annular ring 40, the inner ends of each of the pipes being flared and finished to a smooth curve as indicated at 41 for pipe 33, it being understood that each of the pipes is thus finished so as to present a smoothly rounded exit from the combustion chamber 42. As shown, the several jet pipes 33, 34 and 35 have a length greater than the radius of the combustion chamber 42 such that a resonant condition is obtained in operation. The pipes are preferably securely welded onto the ring 40, as indicated at 44. To the upper surface of the ring 40 there is attached a valve plate and fuel inlet nozzle assembly generally designated 45 having a shoulder 46 which is attached to the upper edge of the ring 40 by means of a plurality of through bolts 48 which are spaced so as not to extend through any of the jet pipes. The portion of the unit 45 opposite the bracket 50 forms the upper portion of the combustion chamber 42 and is thickened and smoothed off at 52 so as to form a smooth entrance into each of the jet pipes 33, 34 and 35. The portion of the unit 45 under the bracket 53 constitutes a valve plate and is drilled with a plurality of converging holes 54 which extend from a ring of ports 55 towards each other and intersect and form the Venturi air inlet passage 56, the outer surface of which is defined by the upper Venturi shaped horn 57 of the unit 45. The holes 54 where they emerge upon the valve plate surface 53 are spaced from each other by the converging intersection and thus form a conical central portion 59 which serves to guide the air-fuel mixture to the ports.

Upon the under surface of the valve plate 53 there is attached a circular valve 60 which is held in place by a valve retainer and backstop 61, the latter being in turn held by the cap screw 62. The valve 60, the valve backstop 61 and cap screw and the location of the drilled holes 54 in respect thereto, may be of any desired type, such as the several patterns described in our copending application Ser. No. 649,882 filed February 25, 1946, entitled Resonating Pulse Jet Engine. On the upper surface of the exhaust housing 72 there is mounted a stationary fuel tank 65 from which there extends a stationary fuel inlet tube 66 which is provided with a fuel jet opening and metering orifice 67 at the throat of the Venturi tube 56. If needed, a suitable heat insulator may be provided between tank 65 and housing 72. As the air-fuel mixture passes through the venturi it is distributed to the holes 54 and delivered to the valve ports 55 whereupon the valve 60 is lifted from the ports and the fuel-air mixture is introduced into the combustion chamber 42. Combustion is initiated by the igniter 67 which may conveniently be of the type illustrated in a copending application of Charles B. Marks Ser. No. 661,451 filed April 11, 1946, now abandoned, entitled Jet Propulsion Ignition, it being understood that when combustion is initiated the rotor is temporarily stalled and held while a high tension ignition lead 68 is attached to the igniter and the companion high tension lead 69 grounded to the machine frame as indicated. Once combustion is initiated it is self-sustaining and the ignition leads 68 and 69 may then be removed, the stalled rotor is then released and the jet produced through the several jet pipes 33, 34 and 35 produces a heavy reaction force and provides a high speed and powerful rotary mechanical power which may be taken off shaft 16 and utilized for any desired purpose such as a blower, etc.

The exhaust gases are conveniently collected in a scroll generally designated 72 which has central openings 73 and 74. The opening 74 is conveniently made sufficiently large so that the igniter wire may conveniently be attached through it for starting.

In operation the rotor 30 draws air through the openings 73 and 74 by way of arrows 75 and 76, thus cooling the rotor. The air and exhaust gases are collected in the scroll 78 and discharge through the scroll outlet 79 to an exhaust flue or directly to the atmosphere in the event the unit is used out of doors where exhaust gases are of no inconvenience.

It will be noted that due to the thickened edge 23 of the flange 17 on the rotor a slight space is provided at 80. A plurality of holes are provided at 81 through which air enters axially into the space near the center of the combustion chamber and it moves radially outward via arrows 82 and out of the apertures 83, thereby producing a cooling effect on the plate 31 immediately under the combustion zone. If desired, the flange 23 may be much deeper, providing any desired amount of cooling air for sustained operation. Where the unit is used for only a few seconds or a few minutes of operation at a time, the amount of cooling air required at this point is not very large and the cooling vents 81—83 may therefore be dispensed with for such modes of operation.

By curving the jet pipes 33, 34 and 35 so that as they leave the combustion chamber they leave nearly radially and then through a decreasing radius reach the curvature of their tips 39, the development of excessive hot spots may be eliminated. It has been found through experiment that the tip portion of a pulse jet exhaust pipe normally runs at a considerably lower temperature than the portions of the pipe near the combustion chamber and it has also been determined that any abrupt changes in curvature of the pipe are likely to produce excessive heating, probably due to friction plus the intense concentration of high temperature gases at these points. By smoothly curving the entrances of each jet pipe at 41 and gradually decreasing the radius of curvature hot spots are eliminated. Furthermore, by welding each of the jet pipes 33, 34 and 35 to the plate 31, at one or both sides of the pipe, a large amount of heat is conducted to the plate 31 and consequently dissipated.

It will be understood that the mode of operation of the jet and valve is of the type known as cyclic, or pulse jet. The type of air inlet passage described in our copending application Ser. No. 661,367 filed April 11, 1946, now abandoned, entitled Valve Mechanism, may of course be substituted for the valve mechanism.

As many apparently widely different embodiments of this invention may be made without departing from the spirit and scope thereof, it is to be understood that we do not limit ourselves to the specific embodiments herein except as defined by the appended claims.

What we claim is:

1. A rotary pulse jet engine capable of producing torque from a stationary condition comprising a centrally located combustion chamber having smooth walls and substantially free of intermediate obstructions conducive to a rapid pulsating flow of gases therethrough, means for mounting said chamber for rotation about a central axis, air inlet means for supplying combustion air to said combustion chamber, means for introducing fuel to form a combustible mixture in said combustion chamber, means for initiating combustion in said chamber with resultant resonant self-sustained intermittent combustion therein, means providing for inflow of air from said air inlet means into said combustion chamber under the periodic resonating action therein while substantially preventing reverse flow through said air inlet, a plurality of elongated jet exhaust tubes having a length greater than the radius of said combustion chamber such that a resonant condition is obtained, each said tube opening in substantially unrestricted relation directly into said combustion chamber and extending therefrom in a generally outward and tangential direction forming therewith a common system resonant in gases and capable of cyclic self-induction of combustion air and continued cyclic self-ignition of the fuel and air in said chamber automatically and independently of the rotation of said chamber.

2. A rotary pulse jet engine capable of producing torque from a stationary condition comprising a centrally located combustion chamber having smooth walls and substantially free of intermediate obstructions conducive to a rapid pulsating flow of gases therethrough, means for mounting said chamber for rotation about a central axis, an air inlet substantially on said axis for supplying combustion air to said combustion chamber, means for introducing fuel to form a combustible mixture in said combustion chamber, means for initiating combustion in said chamber with resultant resonant self-sustained combustion therein, means providing for inflow of air from said air inlet into said combustion chamber under the periodic resonating action therein while substantially preventing reverse flow through said air inlet, a plurality of elongated jet exhaust tubes having a length greater than the radius of said combustion chamber such that a resonant condition is obtained, each said tube opening in substantially unrestricted relation directly into said combustion chamber and extending therefrom in a generally outward and tangential direction forming therewith a common system resonant in gases and capable of cyclic self-induction of combustion air and continued cyclic self-ignition of the fuel and air in said chamber automatically and independently of the rotation of said chamber.

3. A rotary pulse jet engine capable of producing torque from a stationary condition comprising a centrally located combustion chamber having smooth walls and substantially free of intermediate obstructions conducive to a rapid pulsating flow of gases therethrough, means for mounting said chamber for rotation about a central axis, an air inlet substantially on said axis for supplying combustion air to said combustion chamber, means for introducing fuel to form a combustible mixture in said combustion chamber, means for initiating combustion in said chamber with resultant resonant self-sustained combustion therein, means substantially on said axis providing for inflow of air from said air inlet into said combustion chamber under the periodic resonating action therein while substantially preventing reverse flow through said air inlet, a plurality of elongated jet exhaust tubes having a length greater than the radius of said combustion chamber such that a resonant condition is obtained, each said tube opening in substantially unrestricted relation directly into said combustion chamber radially outwardly of said axis and extending therefrom in a generally outward and tangential direction forming therewith a common system resonant in gases and capable of cyclic self-induction of combustion air and continued cyclic self-ignition of the fuel and air in said chamber automatically and independently of the rotation of said chamber.

4. In a rotary pulse jet engine capable of producing torque when stationary, a rotor-combustion chamber comprising a disk, a circular ring wall having a maximum diameter less than that of the disk positioned concentrically on the disk and fastened thereto, an air inlet and valve horn having a Venturi air inlet, a valve surface and a mounting flange the latter being of a diameter sufficient to close the ring wall, means for fastening the air inlet and valve horn flange to the ring wall so as to close it and form a combustion chamber within the ring wall, at least one jet exhaust tube connected to the combustion chamber through the ring wall and extending in a generally outward and tangential direction therefrom along said disk, said tube forming with the combustion chamber a resonant pulse jet system, said tube being fastened to said disk, and bearing means mounting said rotor-combustion chamber for rotation about a central axis through said disk.

5. The apparatus of claim 4 further characterized in that an exhaust collector scroll having a closure ring above and below the disk and provided with an exhaust collecting scroll is mounted so as to enclose the disk which rotates therein.

6. The apparatus of claim 4 further characterized in that an exhaust collector scroll having a closure ring above and below the disk and provided with an exhaust collecting scroll is mounted so as to enclose the disk which rotates therein, said exhaust scroll closure rings above and below the disk being spaced therefrom so as to provide for cooling air inflow against both faces of the disk as it rotates.

7. A rotary pulse jet engine comprising a frame, a scroll having centrally apertured housing plates spaced from each other with the apertures aligned and connected at their outer edges by a gas collection scroll having a discharge outlet, a combustion chamber-rotor assembly, a shaft connected to said assembly and journaled on the frame for rotation, said rotor assembly including a circular plate mounted on the shaft so as to rotate about the center of the plate, a ring wall centrally attached to the plate and extending from one side thereof, an air and fuel intake tube positioned so as to be coaxial with said shaft and extending outwardly through one of the apertures of the scroll housing plate and forming a combination chamber with said plate and ring wall, said air and fuel intake tube being fitted to the ring wall so as to close said wall, a fuel inlet nozzle in said tube, valve means in the tube for preventing back-flow of gases therethrough, and at least one jet exhaust tube connected through the ring wall of the combustion chamber and extending in a generally outward and tangential direction along one side of the plate and attached thereto and forming with said combustion chamber a resonant pulse jet system, said rotating ports being balanced for rotation at high speed.

8. The apparatus of claim 7 further characterized in that a fuel tank is mounted in insulated relation on the exhaust scroll.

9. The apparatus of claim 7 further characterized in that the central apertures of the scroll housing plates are of sufficient size to permit inflow of cooling air against the combustion chamber-rotor assembly therein.

WILLIAM L. TENNEY.
CHARLES B. MARKS.

REFERENCES CITED

The following references are of record in the file of this patent:

UNITED STATES PATENTS

| Number | Name | Date |
| --- | --- | --- |
| 364,866 | Seigneuret | June 14, 1887 |
| 684,743 | Burger | Oct. 15, 1901 |
| 1,021,521 | Héroult | Mar. 26, 1912 |
| 1,049,213 | Dresser | Dec. 31, 1912 |
| 1,853,869 | Marks | Apr. 12, 1932 |
| 1,887,001 | Zetterberg | Nov. 8, 1932 |
| 1,983,405 | Schmidt | Dec. 4, 1934 |
| 2,414,829 | McCollum | Jan. 28, 1947 |

FOREIGN PATENTS

| Number | Country | Date |
| --- | --- | --- |
| 412,478 | France | May 3, 1910 |

OTHER REFERENCES

"The Aero-Resonator Power Plant of the V-1 Flying Bomb" by I. G. Diedrich, pages 4 and 5, Project Squid, Princeton, New Jersey, 1948.

"Flight," October 5, 1944, pages 364–370.